United States Patent [19]

Sakai

[11] Patent Number: 4,846,456
[45] Date of Patent: Jul. 11, 1989

[54] RECIRCULATING DOCUMENT FEEDING APPARATUS

[75] Inventor: Toshiyuki Sakai, Osaka, Japan

[73] Assignee: Minolta Camera Kabushiki Kaisha, Osaka, Japan

[21] Appl. No.: 201,427

[22] Filed: Jun. 2, 1988

[30] Foreign Application Priority Data

| Jun. 3, 1987 | [JP] | Japan | 62-139611 |
| Jun. 3, 1987 | [JP] | Japan | 62-139613 |
| Jun. 3, 1987 | [JP] | Japan | 62-139614 |
| Jun. 3, 1987 | [JP] | Japan | 62-139615 |
| Jun. 3, 1987 | [JP] | Japan | 62-139616 |
| Jun. 3, 1987 | [JP] | Japan | 62-139617 |

[51] Int. Cl.$^4$ .............................. B65H 5/02
[52] U.S. Cl. ........................ 271/3.1; 271/301; 355/75; 355/25
[58] Field of Search ............ 271/3, 3.1, 273, 274, 271/301; 355/75, 25

[56] References Cited

U.S. PATENT DOCUMENTS

| 4,169,674 | 10/1979 | Russel. | |
| 4,179,215 | 12/1979 | Hage. | |
| 4,365,889 | 12/1982 | Silverberg | 271/3.1 X |
| 4,367,947 | 1/1983 | Arter et al. | 271/4 X |
| 4,469,436 | 9/1984 | Jones et al. | 271/3.1 X |
| 4,739,376 | 4/1988 | Kanekol | 355/75 |

FOREIGN PATENT DOCUMENTS

| 55-30621 | 8/1980 | Japan. |
| 58-224931 | 12/1983 | Japan. |
| 60-61767 | 4/1985 | Japan. |
| 60-42462 | 9/1985 | Japan. |

Primary Examiner—Joseph J. Rolla
Assistant Examiner—Boris Milef
Attorney, Agent, or Firm—Burns, Doane, Swecker & Mathis

[57] ABSTRACT

The invention relates to a recirculating feeding apparatus for moving an original from a tray through an exposure position to the tray. The apparatus comprises a transparent member movable through the exposure position, a recirculating path, a driving assembly, and a retracting assembly for retracting a portion of the recirculating path from the transparent member. In the recirculating path, a sheet original is fed from a tray to the exposure position of the transparent member and to the tray. For a thick original, the driving assembly moves the transparent member across the exposure position.

10 Claims, 8 Drawing Sheets

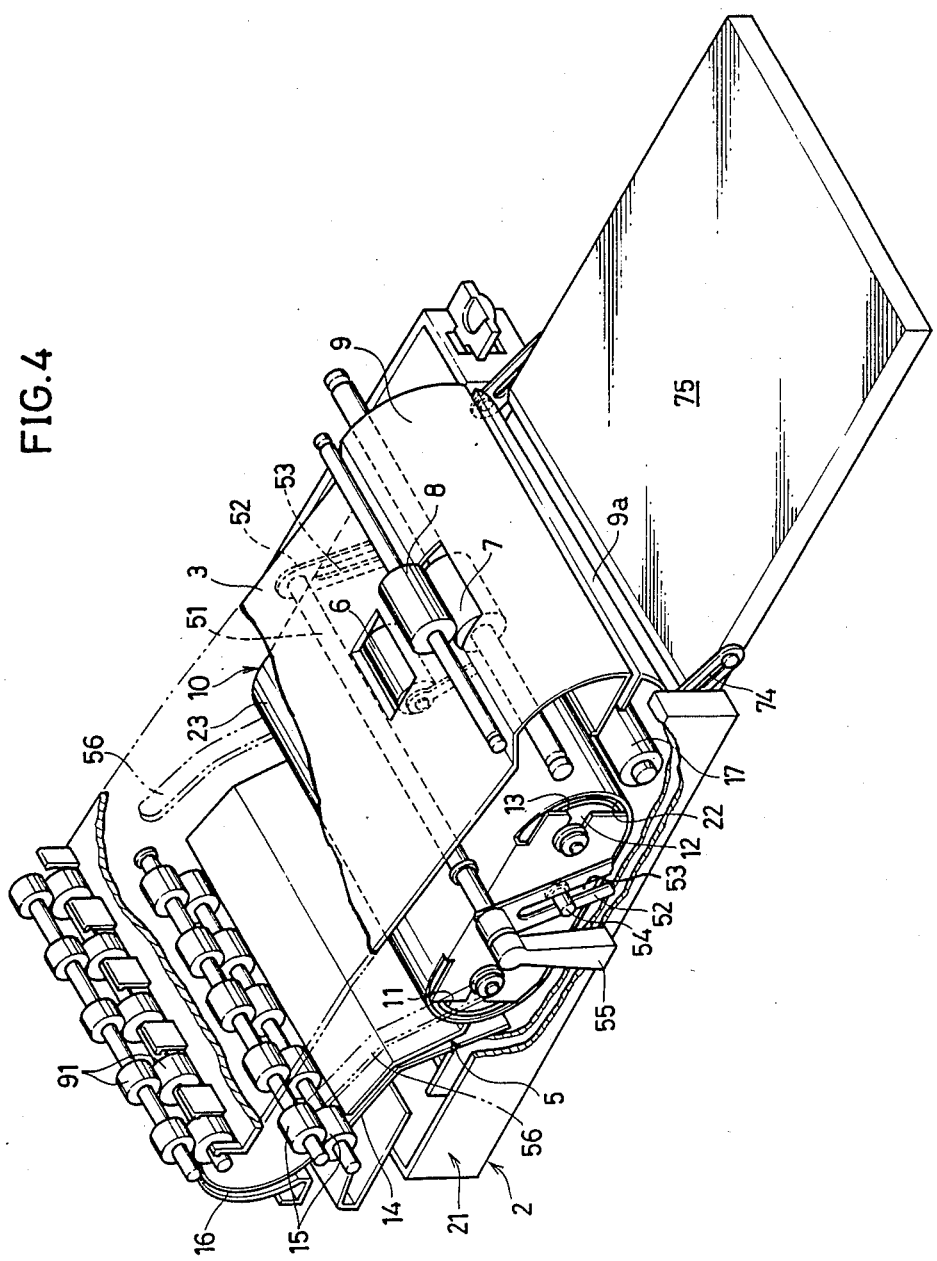

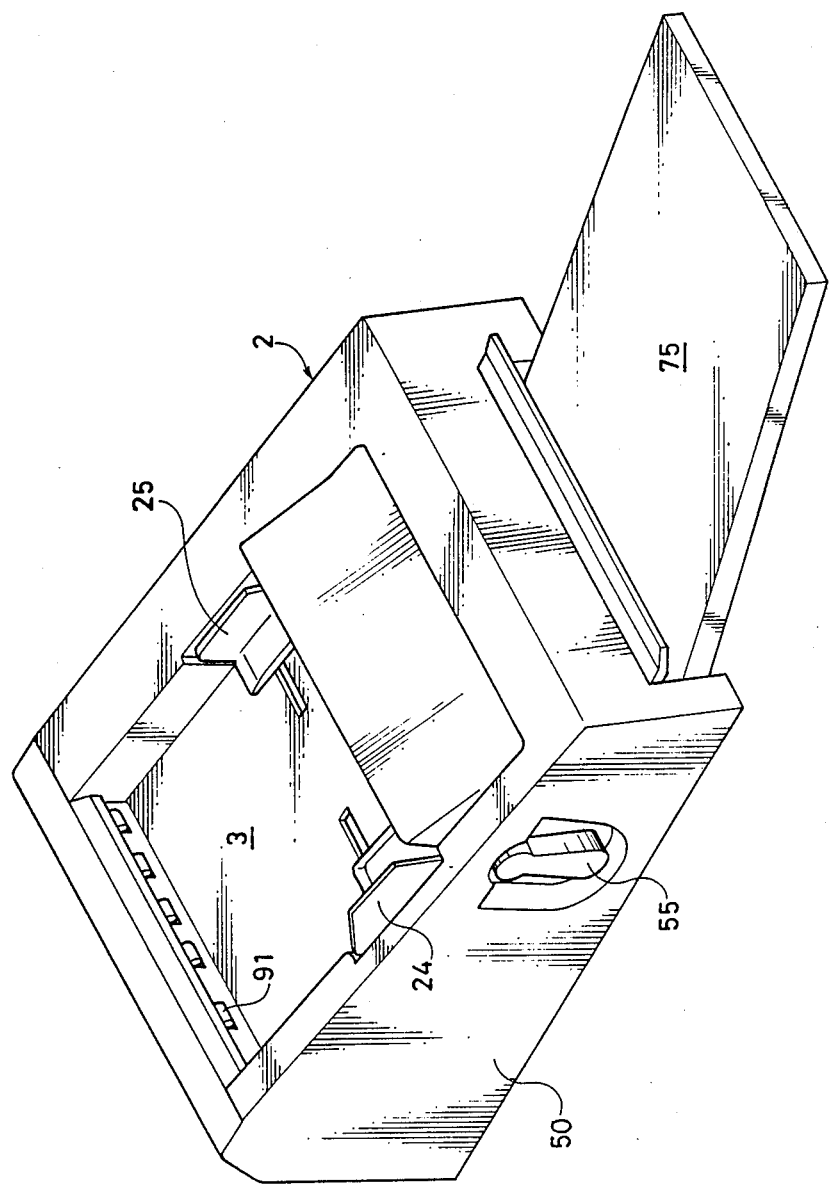

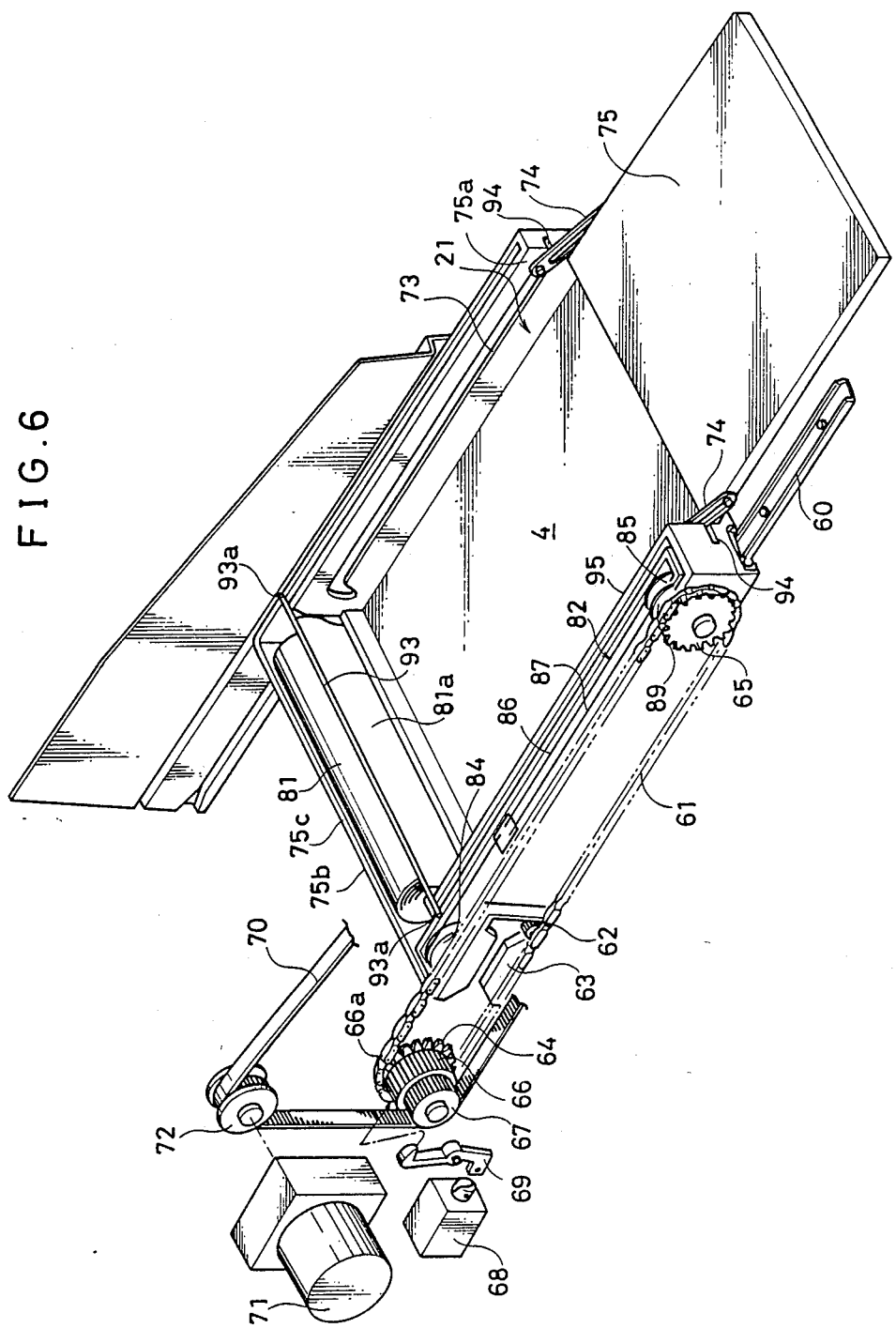

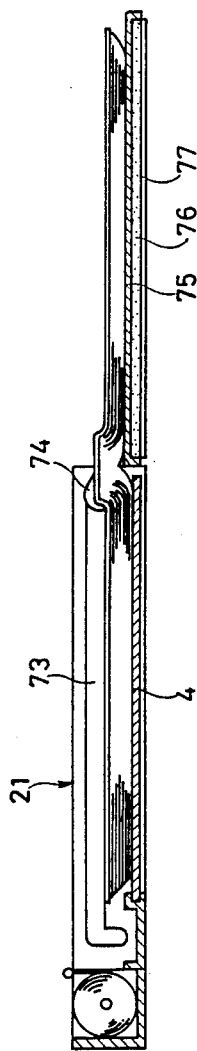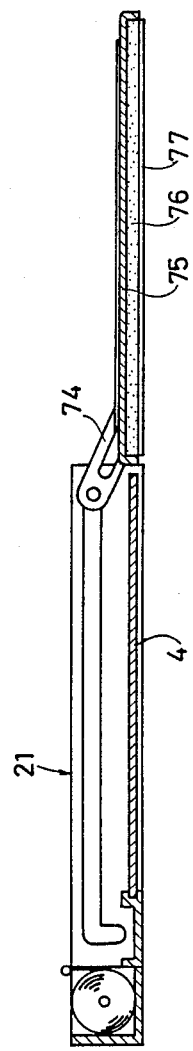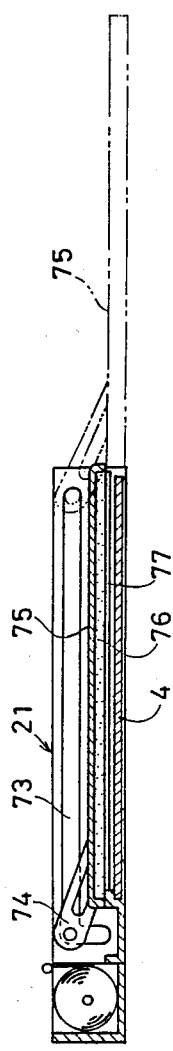

RECIRCULATING DOCUMENT FEEDING APPARATUS

BACKGROUND OF THE INVENTION

1. Field of the Invention

The present invention relates to a recirculating document feeding apparatus and, more particularly, it relates to a recirculating document feeding apparatus used with a copying machine, an image reader and the like by which sheet originals are recirculated from a tray through an exposure position to the tray.

2. Description of the Prior Art

Conventionally, for apparatuses such as a copying machine, an image reader, a facsimile, and the like, there are three methods of slit exposure. In the first method, which is the most popular method, an original is placed on a fixed original support table to be mirror scanned. In the second method, which is widely used in inexpensive machines, the original support table is moved to scan the original placed thereon. In the third method, originals are automatically fed successively to the exposure position, and the moving originals are copied.

Few apparatuses employ the third method because of the following reasons.

(1) The originals are liable to be damaged, since they are handled much more than in other methods.

(2) A book or a thick original can not or hardly be handled, since the original must be transferred.

The advantage of the third method is that a large number of sheet originals can be successively fed with a constant interval and the originals can be processed at high speed since the method requires no return time after the scanning, which time was required in the method of mirror scanning or in the method in which the original support table is moved.

As an example of a document feeding apparatus employing the third method, a so-called recirculating document feeding apparatus is proposed in U.S. Pat. No. 4,169,674, in which sheet originals placed on a tray are successively fed to the exposure position and, thereafter, returned from the exposure position to the tray again. In such recirculating document feeding apparatus, the first disadvantage can be eliminated, since the reliability of feeding paper to the machine is enhanced and, by providing a detecting mechanism properly, the reliability can be still further enhanced. However, the second disadvantage has not yet been completely eliminated.

In another type of original feeding apparatus such as shown in Japanese Examined Patent Publication No. 30621/1980, a glass support used only for a sheet original and another glass support used only for a thick original are provided. In an apparatus shown in Japanese Examined Patent Publication No. 42462/1985, an automatic document feeder for sheet originals is separately arranged on a side of the fixed original support table for placing a thick original, and original glass supports are respectively provided thereon. In this apparatus, the switching control between the mirror scanning for the original support table and the automatic document feeding is carried out. These conventional original automatic feeding apparatuses by which the thick original can be fed must be enlarged and complicated by providing the original glass supports respectively for the sheet original and thick original.

SUMMARY OF THE INVENTION

An object of the present invention is to provide an improved recirculating document feeding apparatus.

Another object of the present invention is to provide a small and simple apparatus by which books, thick originals as well as sheet originals can be handled.

A further object of the present invention is to provide a recirculating document feeding apparatus which is capable of handling books and thick originals as well as sheet originals, and by which these originals are well positioned and pressed on the original glass support.

In the apparatus in accordance with the present invention, the sheet original is moved from a tray through an exposure position to the tray. The apparatus comprises a transparent member, means for providing a recirculating path, driving means, and retracting means. The transparent member is changed between a standstill state and movabale state through the exposure position. Through the recirculating path, a sheet original is fed from a tray onto the transparent member at the standstill state and returned to the tray. For thick originals such as books, the driving means moves the transparent member across the exposure position. The retracting means retracts a portion of said recirculating path from the transparent member, when the transparent member is moved.

The recirculating path may comprise a first portion for feeding the original out from the tray, a second portion for transporting the original received from the first portion along the portion of the transparent member corresponding to the exposure position, and a third portion for returning the original received from the second portion to the tray.

The apparatus may further comprise an outer housing for holding the recirculating path forming means, and an inner housing provided movably in association with the outer housing for holding the transparent member.

In this apparatus, the original may be pressed onto the transparent member when the transparent member is moved with the original placed thereon.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view showing a retracting mechanism of the recirculating unit of the automatic document feeder;

FIG. 5 is an outer perspective view of the automatic document feeder;

FIG. 6 is a perspective view showing a book carrier and a driving mechanism thereof of the automatic document feeder;

FIGS. 7 to 9 are vertical sectional views showing states of the book carrier during use.

DESCRIPTION OF THE PREFERRED EMBODIMENTS

One embodiment of the present invention applied to an automatic document feeder for use in a copying machine will be hereinafter described with reference to the figures.

Figure 1:
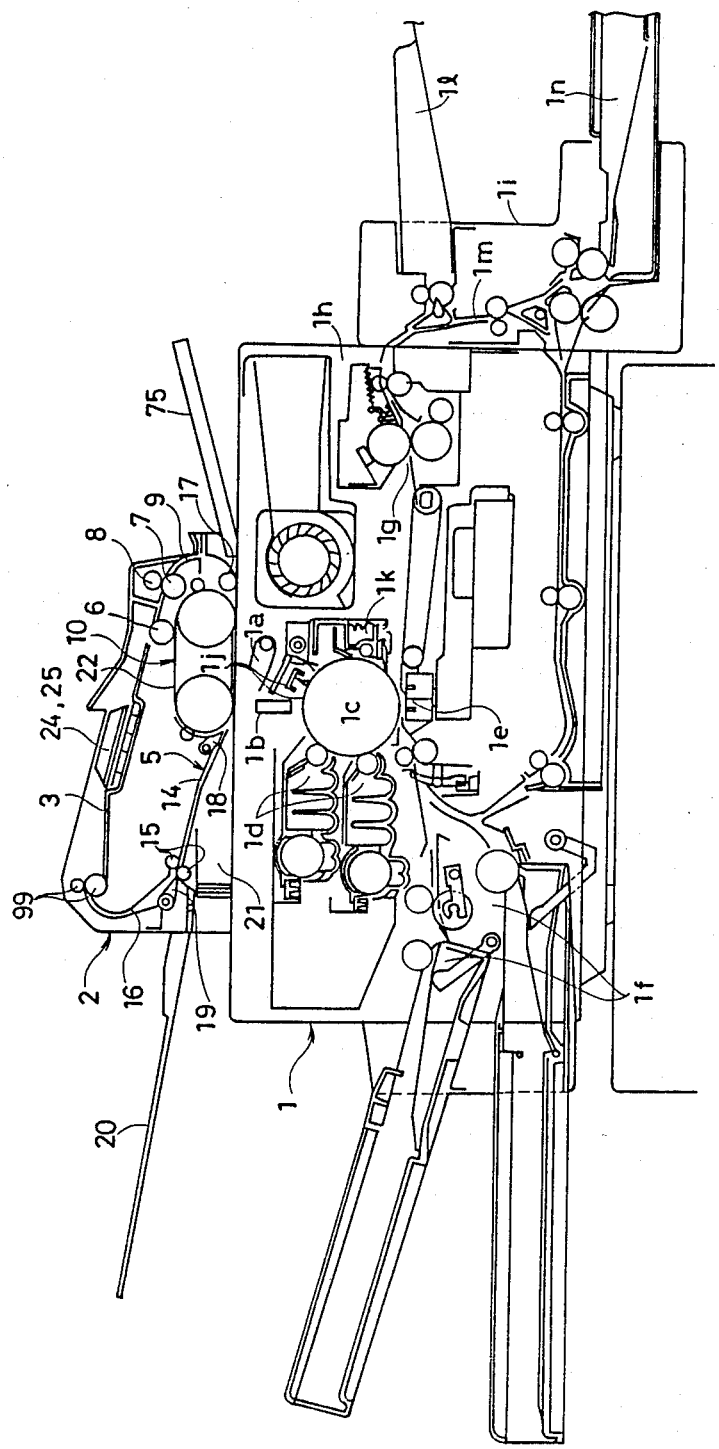
FIG. 1 is a vertical sectional view showing the whole structure of a copying machine in accordance with one embodiment of the present invention.

The whole structure will be described with reference to FIG. 1. The body 1 of the copying machine shown in the central portion of the figure comprises a light source 1a and a lens array 1b for illuminating the surface of an original passing through an exposure position; a photoreceptor drum 1c which receives an image exposure from the lens array 1b; a charging portion 1j arranged along the photoreceptor drum 1c; a developing device 1d; a transferring portion 1e; a cleaning portion 1k; a paper feeding portion 1f for feeding paper to the transferring portion 1e; a fixing portion 1g for fixing a copied paper on which the image is; and a paper discharging portion 1h for discharging a fixed copy paper out from the body 1. An automatic document feeder 2 is provided on the body 1. A paper re-feeding unit 1i is connected to the paper discharging portion 1h. The paper re-feeding unit 1i comprises a discharging tray 1l, a paper re-feeding path 1m and a normal paper feeding portion 1n.

Figure 2:
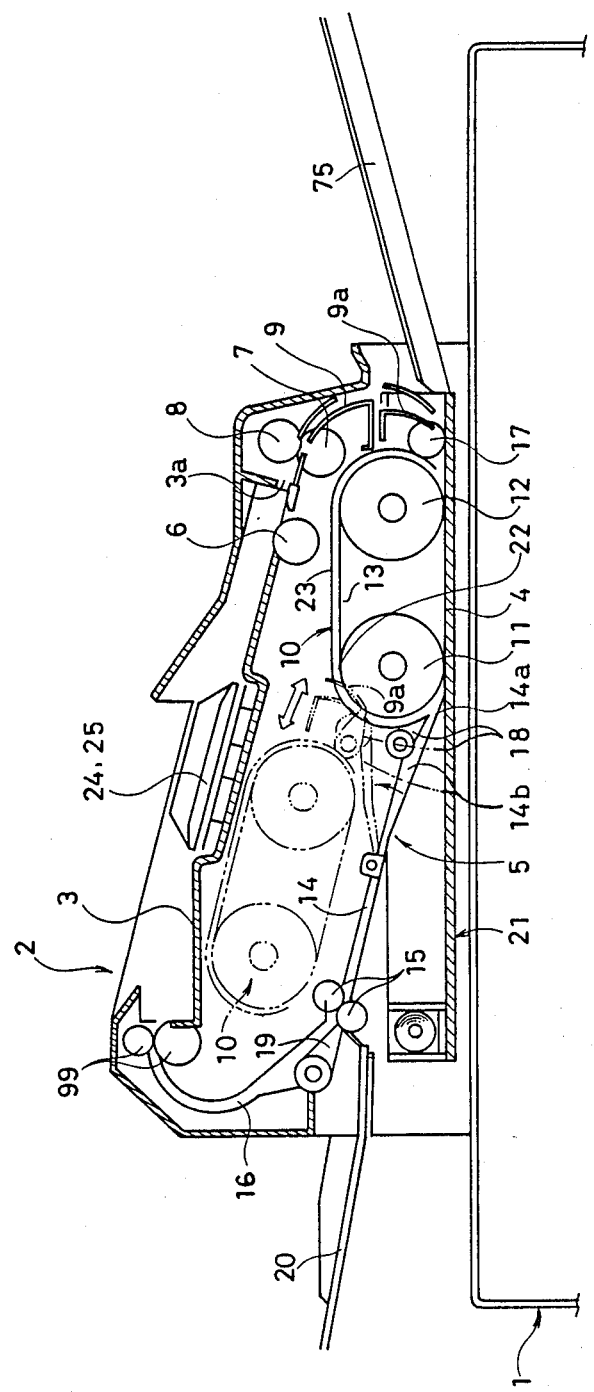
FIG. 2 is a vertical sectional view of an automatic document feeder in accordance with the embodiment of the present invention.

The automatic document feeder 2 is a recirculating type, comprising a tray 3 for containing originals provided in the upper portion and a first recirculating path 5 provided therebelow, as shown in detail in FIG. 2. Originals are fed and returned along the first recirculating path 5, such that the originals contained in the tray 3 are delivered one by one, transferred along the upper surface of the original glass support 4 to pass through the reading position above the lens array 1b, returned to the tray 3 to be stacked on the originals. The tray 3 is inclined with the paper feeding side lowered, and a paper feeding roller 6 is provided in a portion of the paper feding side of the tray 3. The roller 6 feeds originals from the paper feeding opening 3a to the first recirculating path 5.

The first recirculating path 5 comprises delivering rollers 7 and 8 for feeding only one original at the bottom of the stacked originals from the feeding opening 3a; a feeding side U turn guiding member 9 which turns the original upside down so as to place the surface with images to be copied facing the original glass support 4; a recirculating unit 10 provided on the original glass support 4; a return path member 14; an intermediated roller 15; a returning side U turn guiding member 16 which turns upside down the surface of the original and returns the same to the tray 3 from its rear end; a timing roller 17 provided at the outlet of the feeding side U turn guiding member 9; a first switching pawl 18 provided at the inlet of the returning path member 14 for transferring original which have passed through the reading position to again the recirculating unit 10 or to the return path member 14; and a feeding out roller 99 positioned at the outlet portion of the return path member 14 for returning the original to the tray 3.

The roller 7 is a forward rotation roller, and the roller 8 is a reverse rotation roller having a limiter. A separating pawl 14a which is in contact with the original glass support 4 is provided at the lower end of the returning path member 14 for separating the original from the original glass support 4.

An original discharge tray 20 is provided at one end of the automatic document feeder 2, which tray being placed close to the inlet of the returning side U turn guiding member 16. A second switching pawl 19 is provided at the inlet of the returning guiding member 16 which transfers the original passed through the returning path member 14 to the returning side U turn guiding member 16 or to the original discharge tray 20.

The original glass support 4 is arranged so that it forms the bottom surface of a book carrier 21 which is contained in the lower portion of the automatic document feeder 2. The book carrier 21 is provided movably along the upper surface of the body 1 of the copying machine in the direction of the movement of the original. The recirculating unit 10 is provided movable between the operating position shown by the solid line in FIG. 2 and a retracting position diagonally upward from the operating position and below the tray 3 shown by a phantom line. When the unit 10 is in the retracting position, the book carrier 21 can be moved with a thick original such as a book placed thereon, whereby the thick original can be copied while it is moving.

The lower half 9a of the said U turn guiding member 9 and a timing roller 17 are fixed to the recirculating unit 10 so that they move together. The front half 14b of the return path member 14 with the first switching pawl 18 is rotatable to upward in association with the movement of the recirculating unit 10 to the retracting position. Therefore, the U turn guiding member 9, the return path member 14, the timing roller 17 and the first switching pawl 18 do not obstruct of the movement of the book carrier 21 when the unit 10 is in the retracting position.

The recirculating unit 10 comprises a second recirculating path 22 which forms an elliptical path together with a path along the upper surface of the original glass support 4. Originals can be recirculated in this path 22 so as to be fed repeatedly onto the reading position, which is advantageous when a number of copies should be taken from one original. The recirculating unit 10 comprises a driving roller 11 and a driven roller 12 arranged at both ends; a belt 13 wound around the rollers; and a guiding member 23 covering the outer periphery of the belt 13 except the portion opposed to the original glass support 4. The second recirculating path 22 is disposed between the belt 13 and the member 23. The length of the circumference of the second recirculating path 22 is selected to be the maximum length of the original in the feeding direction plus a small margin. Therefore, when a plurality of copies should be taken, copies are sequentially taken with a small interval corresponding to the said selected margin, thereby eliminating almost all loss of the time.

The bearing portion of the driven roller 12 is supported in an elongate hole and is energized by a spring, not shown, in order to absorb the slack of the belt 13. A detecting switch, not shown, which monitors the passed number of originals is provided on the guiding member 23.

Figure 3:
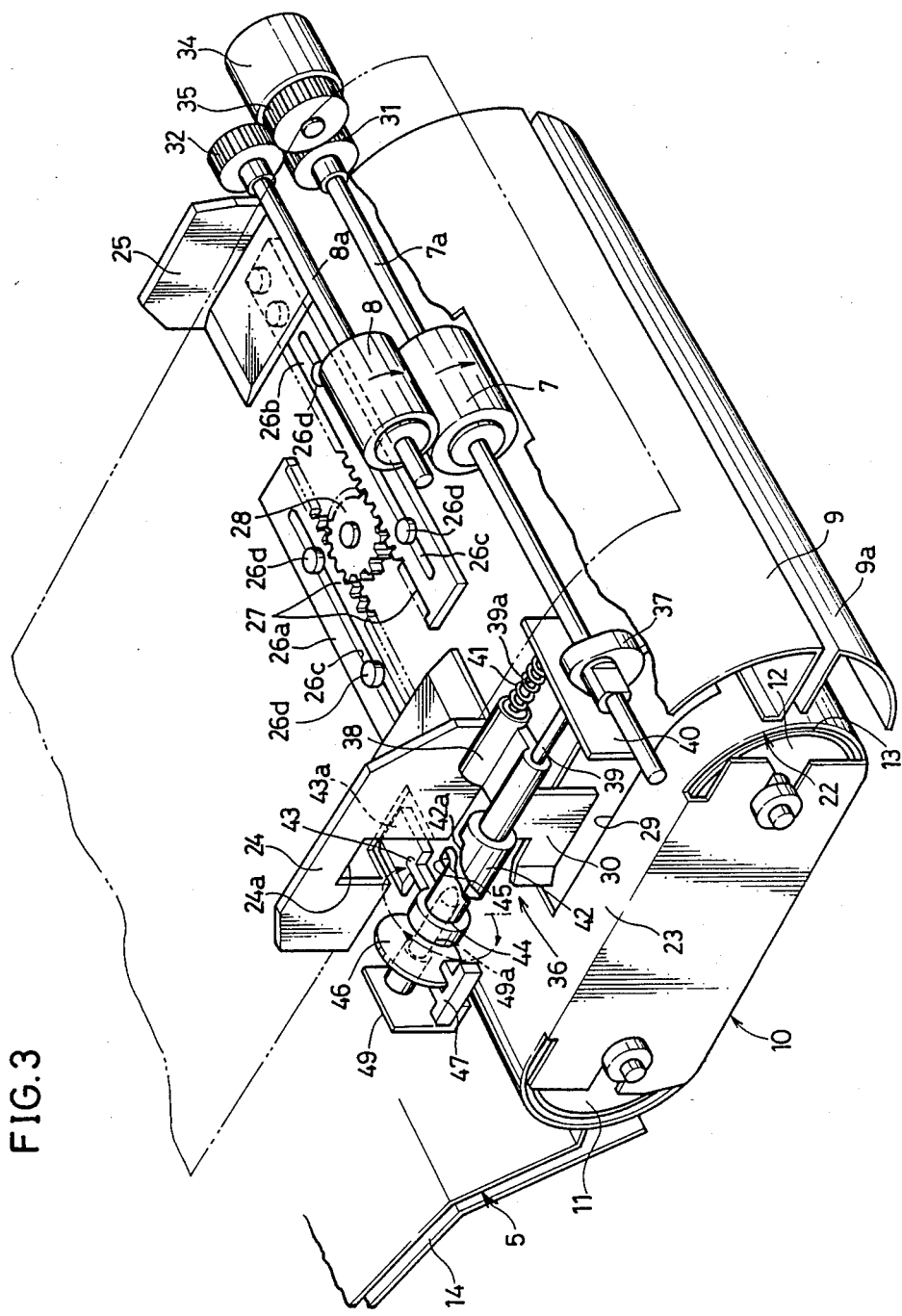
FIG. 3 is a perspective view showing a side regulating member and an empty detecting apparatus of the automatic document feeder.

A pair of side regulating members 24 and 25 are arranged at both sides of the said tray 3 in order to center the original, as shown in FIGS. 3 and 5. The side regulating members 24 and 25 are attached to the linking members 26a and 26b. Each of the linking members 26a and 26b is movable in the direction of the width of the tray 3 with the elongate whole 26c guided by guide pins 26d. The linking members 26a and 26b cooperate through a pinion 28 and a rack 27 engaging therewith, so that the side regulating members 24 and 25 move in synchronization. Therefore, the distance between the members 24 and 25 can be adjusted to the width size of the original to be copied with the center position being maintained as it is.

A skew preventing member 30 extends downwardly from each of the side regulating members 24 and 25 such that the skew preventing member 30 enters from upward the opening 29 formed on the guiding member 23 of the said recirculating unit 10. The members 30 are arranged on both sides of the said second recirculating path 22 to guide both side edges of an original passing through the path 22, thereby preventing skew of the recirculating original. The skew preventing members 30 are adjusted simultaneously when the side regulating members 24 and 25 are adjusted to the size of the original. The opening 29 has the size enough to prevent interference of the skew preventing member 30 with the recirculating unit 10 when the skew preventing member 30 is adjusted or when the recirculating unit 10 moves to the retracting position.

The gear 31 is provided at one end of the support axis 7a of the roller 7, while a gear 32 is provided at one end of the support axis 8a of the roller 8. The gears 31 and 32 are engaged with a driving pinion 35 which is rotatively driven by a driving motor 34, whereby the roller 7 is driven in the paper feeding direction and the roller 8 is driven in the opposite direction simultaneously. A plate cam 37 which activates the empty detecting apparatus 36 is provided at the other end of the support axis 7a of the roller 7.

The empty detecting apparatus 36 is provided at the brackets 38 and 49 fixed on the said side regulating member 24. The detecting apparatus 36 comprises an empty detecting lever 43, a photo switch 47 which detects emptiness of the tray 3 by the position of a rotary disc 46 cooperating with the lever 43, and a cylindrical cam 42 which returns the empty detecting lever 43 to the operating position by the operation of the said plate cam 37.

The empty detecting lever 43 and the rotary disc 46 are supported on a bracket 49 by an axis 49a so that they rotate together with the receiving projection 45. The cylindrical cam 42 is provided on one end of a reciprocating axis 39 which is opposed to the axis 49a on the same axis line and is reciprocatably supported by a bracket 38. An end face cam 42a opposes to the said receiving projection 45 in the direction of its axis. A plate cam follower 40 is fixed to the other end of the reciprocating axis 39 and to one end of an auxiliary axis 39a. The axis 39a is in parallel to the reciprocating axis 39 and reciprocatably supported by the bracket 38. The cam follower 40 abuts the plate cam 37.

The detecting lever 43 is rotatable about the axis 49a and it tends to rotate downward by the weight of itself. When the lever 43 is rotated in the direction of the arrow in FIG. 3, the outer end portion 43a can be placed on the top surface of the original through a window 24 formed on the side regulating member 24. If the original under the end portion 43a is removed, the lever 43 returns to the pendulous position by the weight of itself. When the detecting lever 43 is returned to the pendulous position from the position on the surface of the original, the rotary disc 46 rotates corresponding to the rotation of the detecting lever 43 to change the position of a notch of the rotary disc 46. This change is detected by the photo switch 47, whereby the emptiness of the tray 3 is detected.

Since the reciprocating axis 39 is coupled to the auxiliary axis 39a by the cam follower 40, the rotation of the cylindrical cam 42 is detained and the cam 42 is constantly opposed to the receiving projection 45 of the detecting lever 43 in a prescribed relation. The cam 42 is usually placed at a retracted position due to the spring 41, and it is reciprocated in a prescribed cycle corresponding to the rotation of the plate cam 37 when the rollers 7 and 8 are driven. If it is projected, the end face cam 42a works on the detecting lever 43 in its pendulous position, rotates the lever 43 near the detecting position shown in the figure and releases the lever 43, whereby the detectable position of the lever 43 can be automatically provided. When the shifting lever 43 is at the detecting position, it is off from the end face cam 42a even when the cylindrical cam 42 is projected to the lever 43, whereby the lever 43 is not engaged to the cam. Therefore, the projection and retraction of the cylindrical cam 42 presents no problem during feeding of originals.

As shown in FIGS. 4 and 5, a guiding groove 56 is formed in a frame 50 of the automatic document feeder 2. The groove 56 guides the rear portion of the said recirculating unit 10 from its operating position to the retracting position. A rotary axis 51 having an operating lever 55 is provided above the intermediate portion of the recirculating unit 10. Engaging axes 54 projected to both sides of the recirculating unit 10 are engaged in the elongate holes 53 of the rotating lever 52 provided on the rotary axis 51. The operating lever 55 can rotate the rotary axis 51 with the rotating lever 52, whereby the recirculating unit 10 can be moved diagonally upward to the retracting position and can be returned to the operating position.

The book carrier 21 is movably guided by a guide rail 60 as shown in FIG. 6. An endless chain 61 is provided along the moving path. An engaging pin 62 attached to the book carrier 21 engages an engaging member 63 which is formed on the end portion of one side surface of the book carrier 21. The endless chain 61 extends between a driving sprocket 64 in a fixed position and a driven sprocket 65 which are connected to each other by the chain 61. The driving sprocket 64 is coupled to a driving gear 67 through a spring clutch portion 66. When a rachet wheel 66a is engaged by an engaging pawl 69 which is activated by a solenoid 68, the spring clutch portion 66 is brought to a coupled state. By this coupling, the driving gear 67 engages a driving sprocket 64. The driving gear 67 is associated through a timing belt 70 with a driving pinion 72 which is driven by a driving motor 71.

A manual feed table 75 is coupled to the book carrier 21 through a link 74 movably suported along a guiding groove 73 formed on the inner side surface of the carrier, as shown in FIG. 7. When a book or the like is to be copied, the manual feed table 75 can support a portion of the open book which is not to be copied, as shown in FIG. 8. A back sheet 77 is provided on the lower surface of the manual feed table 75 with a cushion 76 interposed therebetween. Therefore, the book carrier 21 can also be used as a weight for pressing sheet originals unsuitable for automatic feeding, for example, a sheet original with pieces of paper attached thereon, on the original glass plate 4 as shown in FIG. 9.

As shown in FIG. 6, the book carrier 21 has a concave portion 75c consisted of three surrounding walls 75b except the opening 75a for taking in and out the manual feed table 75. An original pressing sheet 81 and peripheral mechanism 82 for firmly pressing said book or a thick original are provided in the concave portion 75c.

Figure 10:
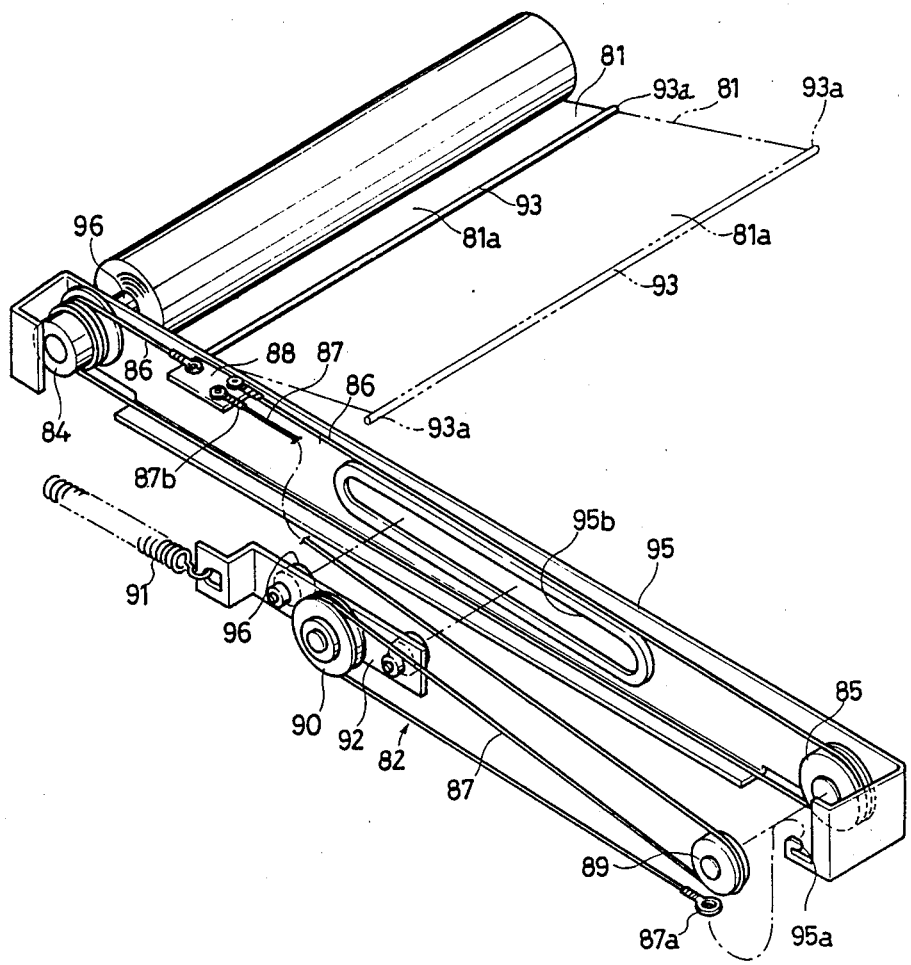
FIG. 10 is a perspective view showing a take up mechanism of an original pressing sheet.

The original pressing sheet 81 is flexible and is wound up by a winding up axis 96, which axis is provided transversely in the concave portion 75c utilizing the frame 95, as shown in FIGS. 6 and 10. A driving pulley 84 is attached on one end of the winding up axis 96. An endless wire 86 is wound between the driving pulley 84 and an idle pulley 85 provided at the other end of the frame 82. Another wire 87 is coupled to the endless wire 86. The wire 87 energizes the endless wire 86 in one direction so as to rotate the winding up axis 96 in the winding up direction, whereby the original pressing sheet 81 is to be wound up. One end 87a of the wire 87 is coupled to a hook 95a of the frame 95 while the other end 87b is coupled to a coupling plate 88 of the endless wire 86. The intermediate portion of the wire 87 runs successively around a pulley 89 and a movable pulley 90 movably held on the frame 82 in zigzag manner. The movable pulley 90 is rotatably supported by a carriage 92 which is guided through a pin 96 by an elongate hole 95b of the frame 90. By energizing the movable pulley 90 in one direction by the spring 91, an energy is applied to the endless wire 86 in the said winding up direction.

When the book carrier 21 is used, the original pressing sheet 81 can be extracted as shown by a phantom line in FIG. 10. The sheet 81 is placed in a extracted position by hooking both ends 93a of the engaging rod 93 at the recessed portion 94 provided at the end portion of the book carrier 21 as shown in FIG. 6. Since the original pressing sheet 81 is stretched by the power of winding up, the original sheet on the original glass support 4 can be pressed thereby. By means of this, originals such as books, which tends to be apart from the glass, can be held on the original glass support 4 in close contact, and white background as an outer margin can be provided.

The operation of the above described apparatus will be described in the following.

First, basic operation of copying a sheet original will be described. An operator adjusts the side regulating guiding members 24 and 25 in accordance with the size of the original, sets originals to be copied in the tray 3 with the upper surface with images to be copied, inputs the required number of copies from the operating panel, and puts on the print switch. Then, the original at the bottom of the stacked originals is fed from the tray 3 through U turn guiding member 9 to the timing roller 17 by the feeding roller 6 and the rollers 7 and 8. The original stops when the front end of the original abuts the roller 17. Since the front edge abuts the timing roller 17, the skew can be prevented. After a prescribed time period, the timing roller 17 is driven and the original is fed to the original glass support 4. The belt 13 is placed on the original glass support 4 and constantly driven in the clockwise direction, so that the original can be transferred through the reading position at uniform speed without floating.

Meanwhile, the operation of the body 1 of the copying machine is started by turning on the print switch. The photoreceptor drum 1c rotates counterclockwise and charges are uniformly applied thereon by the charging portion 1j at a prescribed timing. Thereafter, the image of the original passing through an exposure position is slitwise projected onto the photoreceptor drum 1c to form latent electrostatic image thereon. A fluorescent lamp is preferred to a halogen lamp as a light source 1a of the slit exposure, since the increase of temperature of the original glass support 4 and the like is small. The latent image formed on the photoreceptor drum 1c is turned into a visible image by the developing device 1d. A transferring paper is fed to the transferring portion 1e in synchronization with the original from a predetermined paper feeding portion 1f or 1n. The visible image formed on the photoreceptor drum 1c is transferred onto the transferring paper by the transferring portion 1e. The image is heat fixed on the paper in the fixing portion 1g and, thereafter, the paper is discharged from the discharging portion 1h.

The original which has passed through the reading position is separated from the original glass support 4 by a separating pawl 14a at the end of the returning path member 14. In the mode utilizing the first recirculating path 5, the original is returned through, the returning path member 14 and the returning guiding member 16 to the tray 3.

After the rollers 7 and 8 start the rotation, the cylindrical cam 42 begins reciprocation in association with the rotation of the plate cam 37 in the empty detecting apparatus 36. When the detecting lever 43 is in the pendulous position, the cylindrical cam 42 rotates the lever 43 of the projection, whereby the end portion 43a of the detecting lever 43 is placed on the originals contained in the tray 3. If a plurality of originals are contained in the tray 3, the copied originals which are returned to the tray 3 are not only stacked on the originals to be copied but also placed on the said end portion 43a. The timing for successively copying a plurality of originals is selected such that there will be provided an arbitrarily set interval of about 10 to 200 mm after the rear end of the preceding original is detected.

If the upper most one of the originals to be copied is fed out from the tray 3, the detecting lever 43 placed thereon rotates clockwise by the weight of itself to the pendulous position. This rotation is detected by the photosensor 47, whereby an empty signal is generated, which signal indicates that the initially set originals has been recirculated.

If one copy is desired, the signal indicates the final copying, and is utilized for stopping the automatic document feeder 2 after the final copying. In this case, the pendulous position of the said detecting lever 43 is maintained until the print switch is newly turned on and roller 7 begins to rotate. Further, the switching pawl 18 can be set so that the copied originals are discharged to the original discharging tray 20. By doing so, the originals are all discharged to the original discharging tray 20, which means the tray 3 becomes empty, so that the next originals can be set immediately.

When a plurality of copies are required for each of a plurality of originals, the said empty signal indicates that one copy of each of the originals is finished. The copying operation will be repeated until the signal is counted up to the required number of copies, whereby the required number of copies are automatically provided. In this case, one copy of each original is successively stacked in order repeatedly in the discharging tray 1l. Namely, a set of copies of the originals, having each page arranged in the same order of the originals are repeatedly stacked. Therefore, this mode is convenient to providing some sets of copies in the same order of the originals.

A plurality of copies can be provided for each of a plurality of originals by utilizing the second recirculating path 22. In this mode, the original fed from the tray 3 and passed through the reading position is fed in the recirculating unit 10 by the first switching pawl 18. The copies are taken by the second recirculating path 22 through which the original is recirculated for the selected number of times. Since the original recirculated in the second recirculating path 22 has its both edges regulated by the skew preventing member 30, the original does not skew even if it is recirculated for many times. On this occasion, the number of the passage of the original is detected by a detecting switch provided in the recirculating unit 10. When the number of the passage reaches N−1 (where N is the required number of copies), the first switching pawl 18 is turned to the driving roller 11, and then the original passed through the reading position for the final copy is returned to the tray 3 as in the said sorting mode. After a prescribed time period from the detection of N−1 passage, the feeding of next original is started.

When a plurality of copies are provided for a plurality of originals utilizing the second recirculating path 22, copies of each original are stacked as one block. Therefore, this grouping mode is convenient to providing each set of copies of each original as each block.

The copying operation of an irregular original which can not be set in the tray 3 will be described in the following. In such case, the manual feed table 75 is used. The original is inserted along the manual feed table 75 with the lower surface to be copied. On this occasion, the manual feed detecting switch is turned on to detect the manual feed mode, the timing roller 17 rotates for a very short period of time to grid the front end of the original. When the print switch is turned on in this state, the timing roller 17 is driven corresponding to the paper feed timing of the transferring paper and the original is fed to the reading position.

Since the size of the original can not be known previously in the manual feed mode, the first switching pawl 18 and the second switching pawl 19 are in the position rotated counterclockwise. The original which has passed the reading position is discharged through the returning path member 14 to the original discharging tray 20. In case that the distance between the manual feed detecting switch and the second switching pawl 19 is sufficiently long, detecting the length of the original by the length of the on state of the manual feed detecting switch can be applied. According to this detection, if the length of the original is shorter than the limit of the tray 3, the originals may be discharged to the tray 3 and if it is longer than the limit, the original may be discharged to the original discharging tray 20. When there is no original in the tray 3, the original longer than the limit can be returned to the tray 3 to be recirculated through the tray 3 for providing a plurality of copies.

The operation of copying a book or a thick original (hereinafter referred to as a thick original) will be described in the following. In this case, first the operating lever 55 is turned to switch the mode, and the recirculating unit 10 is retracted diagonally upward to the retracting position. The limiting hook (not shown) which limits the position of the book carrier 21 is released to enable moving. The operator extracts the book carrier 21 to the outside of the automatic document feeder 2, sets an original on the original glass support 4 and if necessary, presses the original by the original pressing sheet 81.

Thereafter, the required number of copies is inputted, the size of the transferring paper is selected and so on, and the print switch is turned on. Then, the engaging pawl 69 engages the rachet wheel 66a in the spring clutch portion 66 by the solenoid 68, so that the clutch portion 66 is coupled and the driving sprocket 64 is driven. By this operation, the scanning of the book carrier 21 starts.

When this operation is detected by a detecting switch (not shown), the transferring paper is fed at the proper timing, and the copy is provided in the prescribed manner. In case that only one copy is required, the detecting switch (not shown) is activated to turn the solenoid 68 off when the book carrier 21 reaches a designated position, whereby the book carrier 21 is stopped at the position. In case that a plurality of copies are required, reciprocating motion of the book carrier 21 and the scanning are carried out for a plurality of times and then the book carrier 21 is stopped at the designated position in the same manner. Thereafter, the original is extracted and, then the book carrier 21 is inserted into the original document feeder 2 until it abuts the regulating member to be fixed by the said regulating hook. By turning the operation lever 55, the recirculating unit 10 is returned to the initial state.

In the scanning of the book carrier 21, although the recirculating unit 10 is retracted, the thickness of the original is limited by the retracting height of the recirculating unit 10, and the like. Therefore, a thickness detecting switch (not shown) is arranged at the inlet of the automatic document feeder 2 to detect the thickness of the original, and when it exceeds the limit, the engaging pawl 69 immediately disengages from the spring clutch portion 66 to stop scanning.

Although a recirculating unit 10 comprising a pair of rollers 11 and 12 and a belt 13 has been described as an example in the foregoing, the original may be guided by rollers instead of the belt, one drum or one roller. The front end of the original may be chucked to be transported instead of being sandwiched.

Although the book carrier 21 is contained in the automatic document feeder 2, it is not limited to this and it may be detachably arranged.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recirculating document feeding apparatus for moving an original from a tray through an exposure position to the tray, comprising:
   a transparent member movable through the exposure position;
   means for forming a recirculating path for feeding the original from said tray onto said transparent member and for returning the same to said tray;
   driving means for moving said transparent member to cross said exposure position; and
   means for retracting a portion of said recirculating path from said transparent member when said transparent member is moved.

2. A recirculating document feeding apparatus according to claim 1, wherein said recirculating path comprises a first portion in which said original is fed from said tray, a second portion in which said original received from said first portion is moved through said exposure position on said transparent member, and a third portion in which said original received from said second portion is returned to said tray.

3. A recirculating document feeding apparatus according to claim 2, wherein said retracting means retract said second portion from said transparent member.

4. A recirculating document feeding apparatus according to claim 3, wherein said second portion comprises a recirculating path shorter than the recirculating path starting from said tray through said exposure position to said tray.

5. A recirculating document feeding apparatus according to claim 1, which further comprises
   an outer housing for holding said recirculating path forming means; and
   an inner housing movably held in said outer housing, for holding said transparent member.

6. A recirculating document feeding apparatus according to claim 5, which further comprises a table member held in said inner housing, being provided adjacent to said transparent member.

7. A recirculating document feeding apparatus according to claim 6, wherein said table member is movable between an original holding position where the table member substantially forms a plane with the adjacent transparent member, and an original passing position on said transparent member.

8. A recirculating document feeding apparatus according to claim 1, which further comprises means for pressing said original on said transparent member, when said transparent member is moved with said original being placed thereon.

9. A recirculating document feeding apparatus according to claim 8, wherein said pressing means comprises a flexible member which covers said original on said transparent member under tension.

10. A recirculating document feeding apparatus according to claim 9, wherein said flexible member is a rolled belt provided at one edge of said transparent member and is energized in the direction of rolling, being extracted from the rolled state to be engaged at the other edge of said transparent member.

* * * * *